United States Patent
Mahle et al.

(10) Patent No.: US 9,470,094 B2
(45) Date of Patent: Oct. 18, 2016

(54) BLADE CASCADE WITH SIDE WALL CONTOURS AND CONTINUOUS-FLOW MACHINE

(71) Applicant: MTU Aero Engines AG, Munich (DE)

(72) Inventors: Inga Mahle, Munich (DE); Markus Brettschneider, Munich (DE)

(73) Assignee: MTU Aero Engines AG, Munich (DE)

( * ) Notice: Subject to any disclaimer, the term of this patent is extended or adjusted under 35 U.S.C. 154(b) by 618 days.

(21) Appl. No.: 13/957,007

(22) Filed: Aug. 1, 2013

(65) Prior Publication Data
US 2014/0044551 A1 Feb. 13, 2014

(30) Foreign Application Priority Data
Aug. 9, 2012 (EP) .................................... 12179761

(51) Int. Cl.
*F01D 5/14* (2006.01)
(52) U.S. Cl.
CPC ............... *F01D 5/145* (2013.01); *F01D 5/143* (2013.01); *Y02T 50/673* (2013.01)
(58) Field of Classification Search
CPC .............................. F01D 5/143; F01D 5/145
USPC ......... 416/189, 191, 193 A, 193 R, 235, 228
See application file for complete search history.

(56) References Cited

U.S. PATENT DOCUMENTS

| | | | |
|---|---|---|---|
| 7,690,890 B2* | 4/2010 | Aotsuka | F01D 5/143 415/191 |
| 7,887,297 B2* | 2/2011 | Allen-Bradley | F01D 5/145 416/193 A |
| 2006/0233641 A1 | 10/2006 | Lee et al. | |
| 2008/0026772 A1 | 1/2008 | Chang et al. | |
| 2010/0080708 A1 | 4/2010 | Gupta et al. | |
| 2010/0284818 A1* | 11/2010 | Sakamoto | F01D 5/143 416/241 R |
| 2011/0014056 A1 | 1/2011 | Guimbard et al. | |
| 2011/0189023 A1* | 8/2011 | Guimbard | F01D 5/143 416/223 R |

FOREIGN PATENT DOCUMENTS

| | | |
|---|---|---|
| DE | 10 2008 021 053 | 10/2009 |
| DE | EP2136033 | 10/2009 |
| WO | WO 2009/129786 | 10/2009 |

* cited by examiner

*Primary Examiner* — Richard Edgar
*Assistant Examiner* — Brian P Wolcott
(74) *Attorney, Agent, or Firm* — Davidson, Davidson & Kappel, LLC

(57) ABSTRACT

A blade cascade for a continuous-flow machine having a non-axisymmetrical side wall contour, whereby the side wall contour has at least one pressure-side elevation and one suction-side depression, whose highest section and lowest section are located over an area 30% to 60% of an extension of the blades in the axial direction, and the axial positions of the outermost sections differ from each other at the maximum by 10% in the axial direction.

14 Claims, 4 Drawing Sheets

BLADE CASCADE WITH SIDE WALL CONTOURS AND CONTINUOUS-FLOW MACHINE

This claims the benefit of European Patent Application EP12179761.7-1267, filed Aug. 9, 2012 and hereby incorporated by reference herein.

The invention relates to a blade cascade for a continuous-flow machine, and it also relates to a continuous-flow machine.

BACKGROUND

A fluid flow conveyed through a flow channel is deflected parallel to the side wall by means of a lateral pressure gradient. Since flow layers that are close to the wall—owing to their lower velocity—are deflected more markedly than flow layers that are far away from the wall, a secondary flow is formed that is superimposed over a main flow. Among other things, this leads to pressure losses. The secondary flows occur regularly in blade cascades of continuous-flow machines such as gas and steam turbines. The blade cascades consist of a plurality of vanes or blades which are arranged next to each other in the circumferential direction in a rotation-symmetrical flow channel and between each of which a blade channel is formed in which the secondary flows arise. The blade channels are each delimited in the radial direction by a radially outer side wall on the housing side or by an outer delimiting wall as well as by a radially inner side wall on the hub side or by an inner delimiting wall. The delimiting walls are formed by a stationary housing section, by a rotor section, by radially inner blade cover plates and/or by radially outer blade cover plates. In the circumferential direction, the blade channels are each delimited by a pressure-side wall and by a suction-side wall of the adjacent blades, In order to reduce the secondary flows or channel vortexes, non-axisymmetrical contours in the form of elevations and/or depressions are often created in the side walls.

Numerous non-axisymmetrical side wall contours are known from the state of the art. Thus, for example, U.S. Pat. Appln. 2008/0026772 A1 proposes arranging the highest section of a pressure-side elevation upstream from the lowest section of a suction-side depression. U.S. Pat. Appln. 2006/0233641 A1 describes a side wall contour in which a pressure-side elevation and a suction-side depression extend over the entire length of the axial blade. U.S. Pat. Appln. 2010/0080708 A1 discloses a side wall contour with a pressure-side elevation whose highest section is arranged in the area of the leading edge, and with a suction-side depression whose lowest section is arranged in the area of the greatest crosswise extension of the blade. German patent application 10 2008 021 053 A1 shows a side wall contour in which a pressure-side elevation extends over an area of 0% to 60% of a blade profile chord, and a suction-side depression extends over an area of 20% to 75% of the profile chord. Here, the highest section of the elevation and the lowest section of the depression are arranged opposite from each other. U.S. Pat. Appln. 2011/0014056 A1 describes a side wall contour whose pressure-side elevation is located over an area of 40% to 80% in the axial extension of the blade and whose suction-side depression is located over an area of 0% to 40% in the axial extension of the blade. Here, the highest section of the elevation is arranged opposite from the lowest section of the depression. Moreover, a second pressure-side elevation and a second suction-side depression can be provided whose outermost sections are arranged opposite from each other. These prior-art side wall contours lead to a reduction of the secondary flows, but they still leave quite a bit of room for improvement.

SUMMARY OF THE INVENTION

It is an object of the present invention to provide a blade cascade for a continuous-flow machine with a reduced secondary flow. Moreover, it an the objective of the invention to create a continuous-flow machine that displays improved efficiency.

A blade cascade according to the invention for a continuous-flow machine has at least one blade channel that is delimited in the circumferential direction by a pressure-side wall of a first blade and by an opposite suction-side wall of an adjacent second blade. In the radial direction, the blade channel is delimited by two opposite delimiting walls, whereby, in the area of the pressure-side wall, at least one of the delimiting walls is provided with at least one pressure-side elevation and, in the area of the suction-side wall, it has at least one suction-side depression. According to the invention, the highest section of the at least one elevation and the lowest section of the at least one depression are located over an area of 30% to 60% of an extension of the blades in the axial direction, whereby the axial positions of the outermost sections differ from each other at the maximum by 10% in the axial direction.

The blade cascade according to the invention has a non-axisymmetrical side wall contour. The side wall contour influences a static pressure field on the at least one delimiting wall and on the opposite blade walls in the edge area in such a way that a secondary flow is reduced. In this manner, flow losses are reduced and the leading flow onto a subsequent blade cascade is improved. The terms "in the area of the pressure-side wall" and "in the area of the suction-side wall" mean that the at least one elevation can be at a distance ≥0 from the pressure-side wall, and the depression can be at a distance ≥0 from the suction-side wall, whereby the at least one elevation and the at least one depression—at a distance from the pressure-side wall or from the suction-side wall—are close to the pressure-side wall or to the suction-side wall and far away from the opposite suction-side wall or pressure-side wall. Since the axial positions of the outermost sections differ from each other at the maximum by 10%, their distance can increase downstream in the axial direction. As a result, the extreme distances at the rear limit value (60%) can be virtually twice as far from each other as at the front limit value (30%).

Preferably, as seen in the circumferential direction, the at least one elevation and the at least one depression are at a distance from each other, separated by a non-contoured delimiting wall section. The elevation and the depression do not make a transition into each other and are thus configured locally.

Preferably, the at least one elevation and the at least one depression are arranged on the blade walls downstream from the leading edges of the blades and upstream from the trailing edges of the blades. This achieves an unimpeded leading flow of a main flow onto the blades and an unimpeded trailing flow of the main flow from the blades. However, they can extend with one of their sections beyond the leading edge and/or the trailing edge.

In one embodiment, the highest section of the elevation is downstream from the lowest section of the depression.

The flow losses can also be favorably influenced if the blade channel has, for example, in the area of the suction-side wall, a second suction-side depression that is arranged downstream from the first depression, said second depression being at a distance from the first depression, separated by a non-contoured section of the delimiting wall.

The flow losses can also be favorably influenced if the blade channel has, for example, in the area of the pressure-side wall, a second pressure-side elevation that is arranged downstream from the first elevation, said second elevation being at a distance from the first elevation, separated by a non-contoured delimiting wall section.

Preferably, as seen in the circumferential direction, the second elevation and the second depression are at a distance from each other, separated by a non-contoured delimiting wall section. Therefore, the second elevation and the second depression do not make a transition into each other and are thus configured locally.

Preferably, the lowest section of the second depression is arranged downstream from the highest section of the second elevation.

In order to permit an unimpeded trailing flow from the blades, the second elevation on the pressure-side wall and the second depression on the suction-side wall can be arranged upstream from the trailing edges. However, they can extend with one section beyond the trailing edges. Here, the second elevation and the second depression can be located with their highest section or lowest distance within the axial area of 30% to 60% of the axial extension of the blade or else outside of this area. Moreover, the axial positions of their outermost sections can differ at the maximum by 10% in the axial direction.

A preferred continuous-flow machine has at least one blade cascade according to the invention. Due to the reduced secondary flows or channel vortexes, such a continuous-flow machine has an improved efficiency in comparison to a continuous-flow machine with a conventional blade cascade.

BRIEF DESCRIPTION OF THE DRAWINGS

Below, preferred embodiments of the invention will be explained in greater detail with reference to schematic depictions. The following is shown.

DETAILED DESCRIPTION

The following embodiments are each described on the basis of a blade cascade of an axial continuous-flow machine such as an aircraft engine or a stationary gas turbine. For example, the blade cascade is arranged in the low-pressure turbine of the continuous-flow machine. However, the invention is also used in blade cascades for compressors having an axial design or for compressors as well as turbines having a radial and diagonal design.

Figure 1:
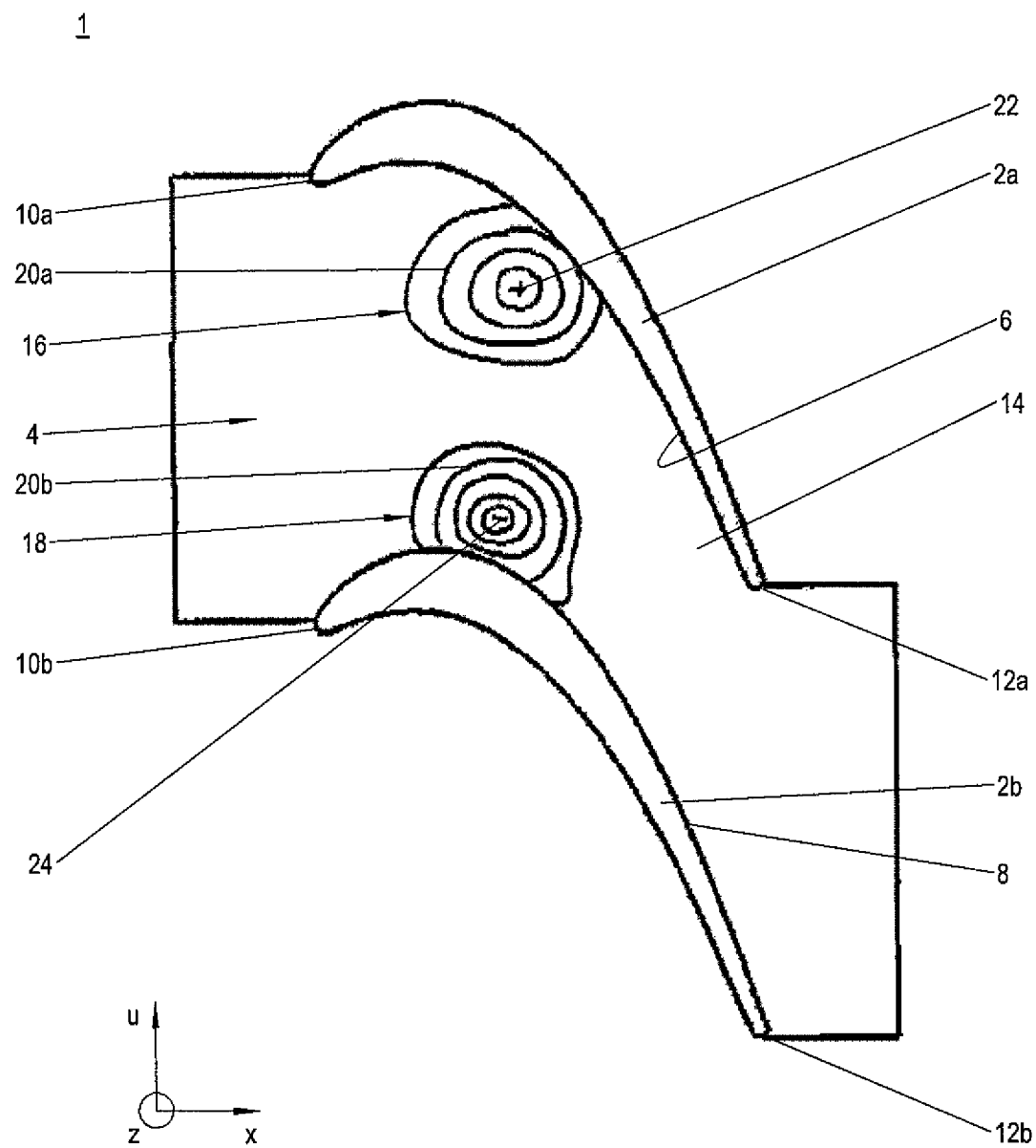
FIG. 1 a top view of a first embodiment of a blade cascade according to the invention in the area of a blade channel, FIG. 2 a top view of a second embodiment of a blade cascade according to the invention in the area of a blade channel, FIG. 3 a top view of a third embodiment of a blade cascade according to the invention in the area of a blade channel, and FIG. 4 a cross-sectional schematic view of a continuous flow machine according to the present invention.

As shown in FIG. 1, a first embodiment of a blade cascade 1 according to the invention has a plurality of blades 2a, 2b, which are arranged next to each other in the circumferential direction u and that each delimit a blade channel 4. According to FIG. 1, a main flow flows through the blade cascade 1 from left to right in the axial direction x, whereby the main flow is appropriately deflected into the blade channels 4 in the circumferential direction u. Moreover, the main flow in front of the blade channels 4, as the so-called leading flow, can have an angle relative to the axial direction x. For the sake of simplicity, however, below, the axial direction x will be considered to be the flow direction.

As seen in the circumferential direction u, each blade channel 4 is formed by a pressure-side wall 6 of the first blade 2a and by an opposite suction-side wall 8 of the second blade 2b, each blade channel 4 extending between a leading edge 10a, 10b and a trailing edge 12a, 12b of the blades 2a, 2b. In the radial direction z, each blade channel 4 is delimited by a side wall on the hub side or by an inner delimiting wall 14. Each blade channel 4 is delimited in the radial direction z by a side wall on the housing side (not shown here), or by an outer delimiting wall (not shown here because of the sectional view, but shown schematically as outer delimiting wall 114 in FIG. 4). The inner delimiting wall 14 is formed, for example, by a rotor section or by a platform on the blade root side or by an inner shroud band. The outer delimiting wall (not shown here) is formed, for example, by a housing section or by an outer shroud band on the blade tip side, and can be configured like the inner delimiting wall 14.

At least the inner delimiting wall 14 is provided with a non-axisymmetrical side wall contour in the form of a front pressure-side elevation or a peak-like individual contour 16 as well as in the form of a front suction-side depression or a valley-like or a dip-like individual contour 18. The elevation 16 and the depression 18 are shown in the drawing by a plurality of isohypses 20a and isobaths 20b, with a plus sign as the highest section 22 or with a minus sign as the lowest section 24. The outermost sections 22, 24 of the individual contours 16, 18 can have the same height or depth, or else a different height or depth. They are each at a distance from each other in the circumferential direction u so that a non-contoured surface section that follows the original course of the inner delimiting wall 14 is formed between the elevation 16 and the depression 18.

In the embodiment shown in FIG. 1, as seen in the axial direction x or flow direction, the elevation 16 and the depression 18 are positioned behind the leading edges 10a, 10b and in front of the trailing edges 12a, 12b on the pressure-side wall 6 or on the suction-side wall 8.

According to the invention, the highest section 22 of the elevation 16 and the lowest section 24 of the depression 18 are located over an area of 30% to 60% of an axial extension of the blades 2a, 2b, whereby the axial positions of the outermost sections 22, 24 differ from each other at the maximum by 10% in the axial direction x. In the embodiment shown in FIG. 1, the highest section 22 of the elevation 16 is located downstream from the lowest section 24 of the depression 18.

The elevation 16 is a section of the inner delimiting wall 14 that extends radially outwards and that tapers approximately conically in the direction of its highest section 22. A root section of the elevation 16 is located on the pressure-side wall 6 downstream from a maximum pressure-side curvature of the blade 2a, and the highest section 22 of the elevation 16 is at a distance from said pressure-side wall 6. Preferably, as seen in the axial direction x, the highest section 22 is located approximately in the middle of the elevation 16.

The depression 18 is a section of the inner delimiting wall 14 that extends radially inwards and that, starting from the inner delimiting wall 14, tapers like a funnel in the direction of its lowest section 24. In the area of a maximum suction-side curvature of the blade 2b, on the opening side, the depression 18 is in direct contact with the suction-side wall 8 and its lowest section 24 is at a distance from the suction-side wall 8. Preferably, as seen in the axial direction x, the lowest section 24 is located approximately in the middle of the depression 18.

Figure 2:
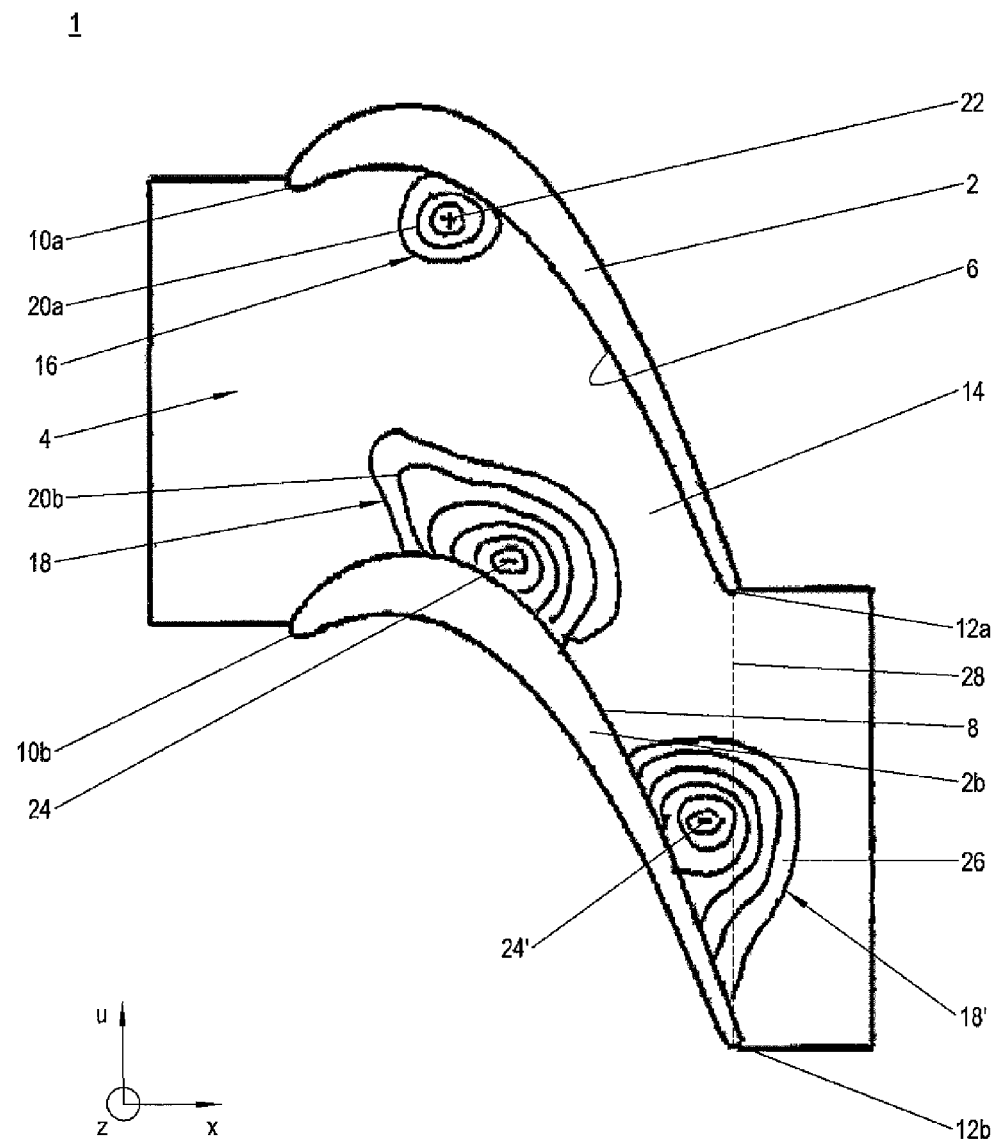

FIG. 2 shows a second embodiment of the blade cascade 1 according to the invention. As seen in the axial direction x or flow direction, a blade channel 4 of the blade cascade 1 has a front pressure-side elevation 16, a front suction-side depression, and a rear suction-side depression 18'. The pressure-side elevation 16 is located on a pressure-side wall 6 of a blade 2a, and the suction-side depressions 18, 18' are located on a suction-side wall 8 of an adjacent blade 2b.

According to the invention, the highest section 22 of the elevation 16 and the lowest section 24 of the front depression 18 are located over an area of 30% to 60% of an axial extension of the blades 2a, 2b, whereby the axial positions of the outermost sections 22, 24 differ from each other at the maximum by 10% in the axial direction x. In the embodiment shown in FIG. 2, the highest section 22 of the elevation 16 is located upstream from the lowest section 24 of the front depression 18. In this embodiment, the lowest section 24' of the rear depression 18' is positioned outside of the area or, as seen in the axial direction x, beyond 60% of the axial extension of the blade 2a.

The elevation is a section of the inner delimiting wall 14 that extends radially outwards and that tapers approximately conically in the direction of its highest section 22. A root section of the elevation is located on the pressure-side wall 6 downstream from a maximum pressure-side curvature of the blade 2a, and the highest section 22 of the elevation is at a distance from said pressure-side wall 6. Preferably, as seen in the axial direction x, the highest section 22 is located approximately in the middle of the elevation 16.

The front depression 18 is a section of the inner delimiting wall 14 that extends radially inwards. In the area of a maximum suction-side curvature of the blade 2b, on the opening side, the front depression 18 is in direct contact with the suction-side wall 8. However, its lowest section 24 is at a distance from the suction-side wall 8. As seen in the circumferential direction u, the front depression 18 is at a distance from the front elevation 16, separated by a non-contoured surface section of the inner delimiting wall 14. Starting from the inner delimiting wall 14, it tapers like a funnel in the direction of its lowest section 24, whereby, as seen in the radial direction z, it drops more steeply downstream from its lowest section 24 than upstream from its lowest section 24. In this manner, the front depression 18 has an elongated extension along the suction-side wall 8 and, as seen in the axial direction x, its lowest section 24 is not in the middle of the depression 18, but rather somewhat downstream.

The rear depression 18' is downstream from the front depression 18 and is at a distance from it, separated by a non-contoured surface section of the inner delimiting wall 14. The front depression 18 is a section of the inner delimiting wall 14 that extends radially inwards and that tapers from the inner delimiting wall 14 like a funnel in the direction of its lowest section 24'. The rear depression 18' is upstream from the trailing edge 12b, on the opening side, directly on the suction-side wall 8. With a section area 26 that is at a distance from the suction-side wall 8, the rear depression 18' extends beyond an imaginary circumferential line 28 between the trailing edges 12a, 12b. As seen in the radial direction z, the rear depression 18' drops more steeply downstream from its lowest section 24' than upstream from its lowest section 24'. It can be lower than, less low than or as low as the front depression 18. The lowest section 24' is at a distance from the suction-side wall 8 and it is upstream from the imaginary circumferential line 28 and thus upstream from the trailing edges 12a, 12b. In the embodiment shown in FIG. 2, the lowest section 24' is almost in the middle of the rear depression 18' as seen in the axial direction x.

Figure 3:
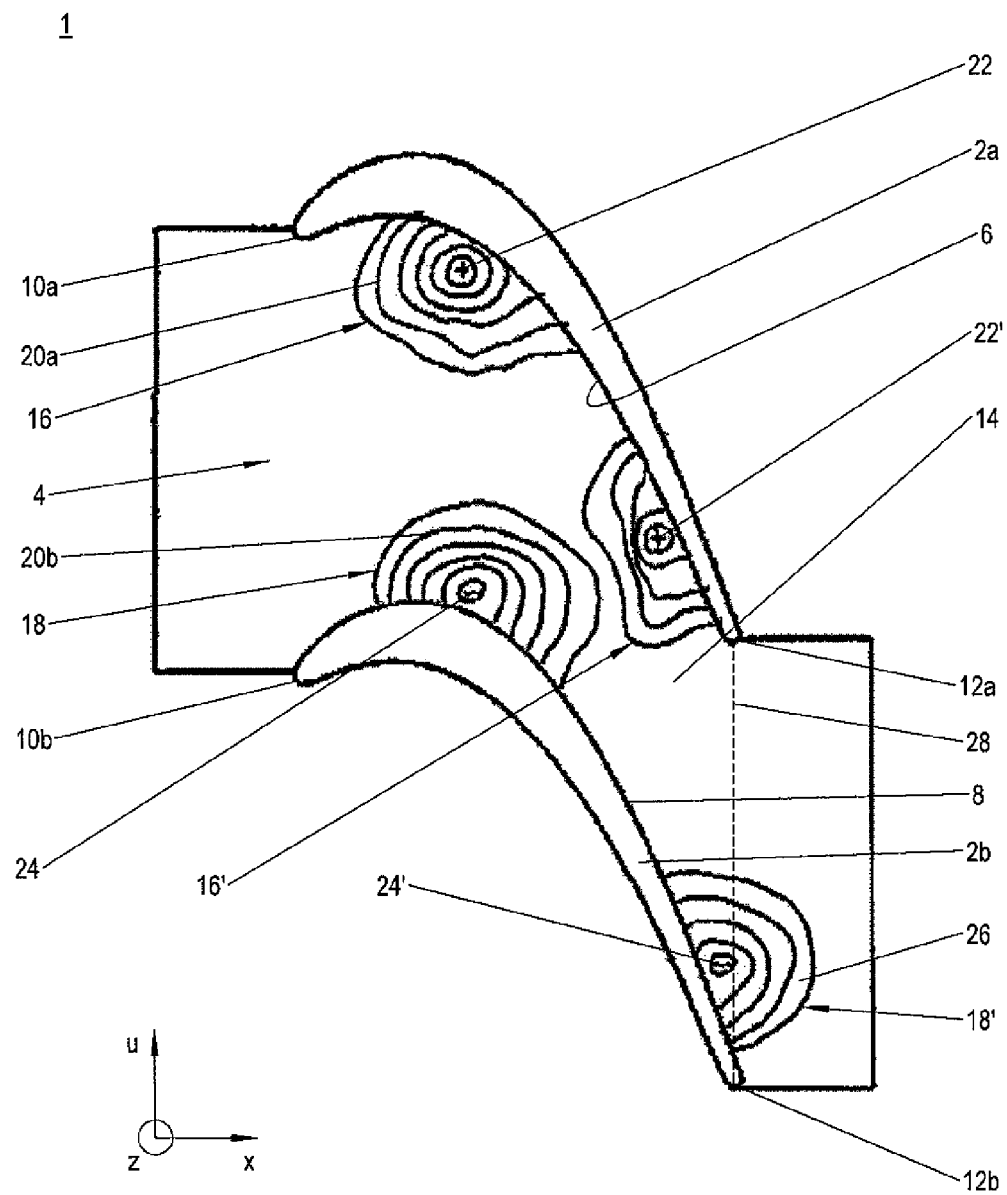

FIG. 3 shows a third embodiment of the blade cascade 1 according to the invention. As seen in the axial direction x or flow direction, a blade channel 4 of the blade cascade 1 has a front pressure-side elevation 16, a rear pressure-side elevation 16', a front suction-side depression, and a rear suction-side depression 18'. The pressure-side elevations 16, 16' are located on a pressure-side wall 6 of a blade 2a, and the suction-side depressions 18, 18' are located on a suction-side wall 8 of an adjacent blade 2b. As seen in the axial direction x, the rear elevation 16' is located upstream from the rear depression 18', and approximately in the middle between the two depressions 18, 18'. Their outermost sections 22, 22', 24, 24' can have the same heights and depths, or else different heights and depths.

According to the invention, the highest section 22 of the front elevation 16 and the lowest section 24 of the front depression 18 are located over an area of 30% to 60% of an axial extension of the blades 2a, 2b, whereby the axial positions of the outermost sections 22, 24 differ from each other at the maximum by 10% in the axial direction x. In the embodiment shown in FIG. 3, the highest section 22 of the front elevation 16 is located upstream from the lowest section 24 of the front depression 18. In this embodiment, the highest section 22' of the rear elevation 16' as well as the lowest section 24' of the rear depression 18' are positioned outside of the area or, as seen in the axial direction x, beyond 60% of the axial extension of the blade 2a.

The front elevation 16 is a section of the inner delimiting wall 14 that extends radially outwards and that tapers approximately conically in the direction of its highest section 22. The front elevation is located in a maximum suction-side curvature of the blade 2a and extends downstream from it. The root section of the elevation 16 is in contact with the pressure-side wall 6 and its highest section 22 is located close to the pressure-side wall 6. As seen in the axial direction x, the highest section 22 is preferably located approximately in the middle of the elevation 16.

The front depression 18 is a section of the inner delimiting wall 14 that extends radially inwards. In the area of a maximum suction-side curvature of the blade 2b, on the opening side, the front depression 18 is in direct contact with the suction-side wall 8, and it is at a distance from the front elevation 16, separated by a non-contoured surface section of the inner delimiting wall 14. Starting from the inner delimiting wall 14, the front depression tapers like a funnel in the direction of its lowest section 24, whereby its lowest section 24 is located close to the suction-side wall 8. As seen in the radial direction z, it drops more steeply upstream from its lowest section 24 than downstream from its lowest section 24. In this manner, as seen in the axial direction x, its lowest section 24 is not in the middle of the depression 18, but rather somewhat upstream.

The rear elevation 16' is downstream from the front elevation 16 and is at a distance from it, separated by a non-contoured surface section of the inner delimiting wall 14. The rear elevation 16' is a section of the inner delimiting wall 14 that extends radially outwards and that, starting from the inner delimiting wall 14, tapers in the direction of its highest section 22. The rear elevation 16' has an elongated extension along the pressure-side wall 6. Upstream from the trailing edge 12a, on the opening side, the rear elevation 16' is in direct contact with the pressure-side wall 6, and it is located completely in front of an imaginary circumferential line 28 between the trailing edges 12a, 12b. As seen in the axial direction x, its highest section 22' is approximately in the middle of the rear elevation 16' and, as seen in the circumferential direction u, it is located close to the pressure-side wall 6.

The rear depression 18' is downstream from the front depression 18 and it is at a distance from the front depression 18, separated by a non-contoured surface section of the inner delimiting wall 14. Furthermore, the rear depression 18' is at a distance from the rear elevation 16', separated by a non-contoured surface section of the rear inner delimiting wall 14. It is a section of the inner delimiting wall 14, which extends radially inwards. Upstream from the trailing edge 12b, on the opening side, the rear depression 18' is in direct contact with the suction-side wall 8. Its depression area 26, which is at a distance from the suction-side wall 8, extends beyond the imaginary circumferential straight line 28 between the trailing edges 12a, 12b. Starting from the inner delimiting wall 14, it tapers like a funnel in the direction of its lowest section 24, whereby, as seen in the radial direction z, it drops more steeply downstream from its lowest section 24' than upstream from its lowest section 24'. The lowest section 24' is close to the suction-side wall 8 and, as seen in the axial direction x, it is located approximately in the middle of the rear depression 18', whereby it is located upstream close to the imaginary circumferential line 28.

Figure 4:
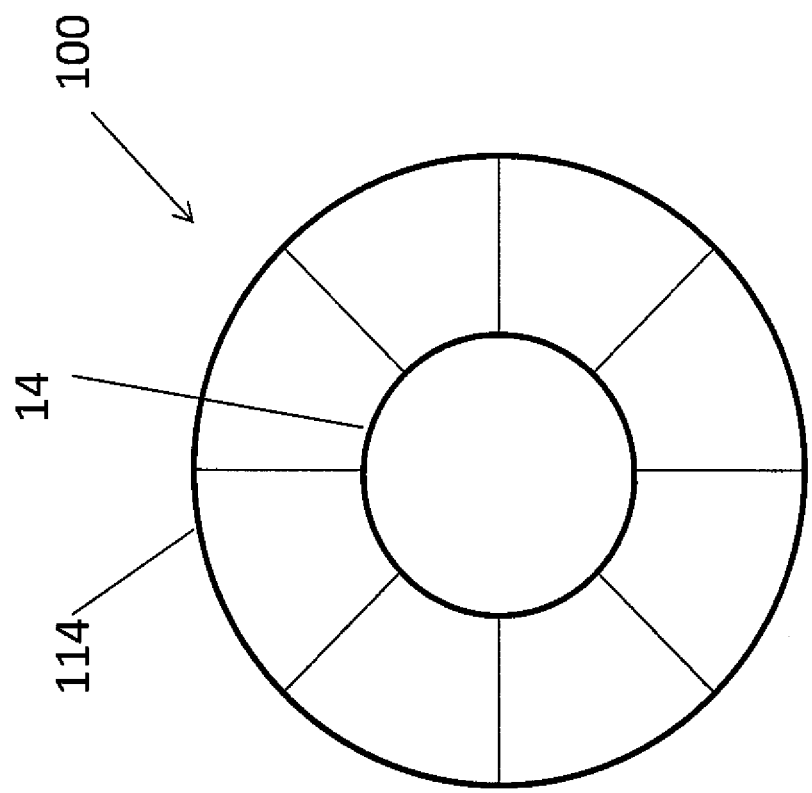

The invention discloses a blade cascade for a continuous-flow machine 100 as shown schematically in FIG. 4 having a non-axisymmetrical side wall contour, whereby the side wall contour has at least one pressure-side elevation and one suction-side depression, whereby the highest section and lowest section of said blade cascade are located over an area 30% to 60% of an extension of the blades in the axial direction, and the axial positions of the outermost sections differ from each other at the maximum by 10% in the axial direction.

LIST OF REFERENCE NUMERALS 1 blade cascade
2a, b blade
4 blade channel
6 pressure-side wall
8 suction-side wall
10a, b leading edge
12a, b trailing edge
14 inner delimiting wall
16, 16' pressure-side elevation
18, 18' suction-side depression
20a, b isohypses/isobaths
22, 22' highest section
24, 24' lowest section
26 section area
28 imaginary circumferential line
100 continuous-flow machine
114 outer delimiting wall
z radial direction
u circumferential direction
x axial direction/flow direction

What is claimed is:
1. A blade cascade for a continuous-flow machine, comprising:
at least one blade channel delimited in a circumferential direction by a pressure-side wall of a first blade and by an opposite suction-side wall of an adjacent second blade and delimited in a radial direction by two opposite delimiting walls,
in the area of the pressure-side wall, at least one of the delimiting walls being provided with at least one pressure-side elevation and, in the area of the suction-side wall, the at least one delimiting wall having at least one suction-side depression, a highest section of the at least one elevation and a lowest section of the at least one depression being located over an area of 30% to 60% of an extension of the blades in an axial direction, and wherein an axial position of the highest section and an axial position of the lowest section differ from each other at a maximum by 10% in the axial direction; and
wherein, in the area of the suction-side wall, a second suction-side depression is arranged downstream from the first depression, the second depression being at a distance from the first depression, separated by a non-contoured section of the delimiting wall.

2. The blade cascade as recited in claim 1 wherein, as seen in the circumferential direction, the at least one pressure-side elevation and the at least one suction-side depression are at a distance from each other, separated by a non-contoured delimiting wall section.

3. The blade cascade as recited in claim 2 wherein the at least one pressure-side elevation and the at least one suction-side depression are arranged downstream from a leading edge of the first and second blades and upstream from a trailing edge of the first and second blades.

4. The blade cascade as recited in claim 1 wherein the highest section of the elevation is downstream from the lowest section of the depression.

5. The blade cascade as recited in claim 1 wherein a lowest section of the second depression is arranged downstream from a highest section of a second elevation.

6. The blade cascade as recited in claim 1 wherein a second elevation is arranged on the pressure-side wall and the second depression is arranged on the suction-side wall, upstream from the leading edges.

7. The blade cascade of claim 1, wherein, in the area of the pressure-side wall, a second pressure-side elevation is arranged downstream from the first elevation, the second elevation being at a distance from the first elevation, separated by a non-contoured delimiting wall section.

8. A continuous-flow machine comprising at least one blade cascade as recited in claim 1.

9. A blade cascade for a continuous-flow machine, comprising:
at least one blade channel delimited in a circumferential direction by a pressure-side wall of a first blade and by an opposite suction-side wall of an adjacent second blade and delimited in a radial direction by two opposite delimiting walls,
in the area of the pressure-side wall, at least one of the delimiting walls being provided with at least one pressure-side elevation and in the area of the suction-side wall, the at least one delimiting wall having at least one suction-side depression, a highest section of the at least one elevation and a lowest section of the at least one depression being located over an area of 30% to 60% of an extension of the blades in an axial direction, and wherein an axial position of the highest section and an axial position of the lowest section differ from each other at a maximum by 10% in the axial direction;

wherein, in the area of the pressure-side wall, a second pressure-side elevation is arranged downstream from the first elevation, the second elevation being at a distance from the first elevation, separated by a non-contoured delimiting wall section.

10. The blade cascade as recited in claim 9 wherein, as seen in the circumferential direction, the second elevation and a second suction-side depression, downstream from the first depression at a distance from the first depression separated by a non-contoured section of the delimiting wall, are at a distance from each other, separated by a non-contoured delimiting wall section.

11. The blade cascade as recited in claim 10 wherein a lowest section of the second depression is arranged downstream from the highest section of the second elevation.

12. The blade cascade as recited in claim 10 wherein the second elevation is arranged on the pressure-side wall and the second depression is arranged on the suction-side wall, upstream from the leading edges.

13. The blade cascade as recited in claim 9 wherein a lowest section of a second depression is arranged downstream from a highest section of the second elevation.

14. The blade cascade as recited in claim 9 wherein the second elevation is arranged on the pressure-side wall and a second depression is arranged on the suction-side wall, upstream from the leading edges.

* * * * *